United States Patent Office 3,476,830
Patented Nov. 4, 1969

3,476,830
PRODUCTION OF STEREO BLOCK
BUTADIENE POLYMER
Herbert Naarmann, Ludwigshafen (Rhine), and Ernst-Guenther Kastning, Assenheim, Germany, assignors to Badische Anilin- & Soda-Fabrik Aktiengesellschaft, Ludwigshafen (Rhine), Germany
No Drawing. Filed May 3, 1966, Ser. No. 547,158
Claims priority, application Germany, May 15, 1965,
B 81,948
Int. Cl. C08d 3/08, 1/14
U.S. Cl. 260—879
4 Claims

ABSTRACT OF THE DISCLOSURE

A process for the production of stereo block butadiene polymers in which a solution of unbranched and sterically unitary 1,4-trans-polybutadiene having a K-value of 20 to 80 is reacted with a solution of 1,4-cis-polybutadiene having a K-value of 20 to 80, both solutions containing active catalyst until the K-value of the polymer is 90 to 120. The process produces elastomeric polybutadienes having superior properties to polybutadiene prepared by conventional methods. The strength of the new polybutadienes in the unloaded condition after vulcanization is greater than conventional polybutadienes. Moreover, the new polybutadienes have an excellent capacity for absorbing oil, good rolling behavior, and good miscibility with other rubbers and/or fillers.

---

The present invention relates to a process for the production of butadiene polymers by polymerization of butadiene using catalysts of compounds of transition metals of Groups IV to VIII of the Periodic System of Elements and alkyl metal compounds.

Polymerization of butadiene with Ziegler-Natta catalysts is known. Ziegler-Natta catalysts are those composed of compounds of transition metals of Groups IV to VIII of the Periodic System of Elements and organometallic compounds. The transition metal compounds are derived mainly from metals of Groups IV, V and VIII, and compounds of titanium, vanadium and cobalt, particularly their halides and complex compounds, are preferred. Alkyl aluminum compounds, which may contain halogen atoms attached to the aluminum atom, have acquired special importance as the organometallic compounds.

The polybutadienes obtained according to this method are stereo-regular in configuration and depending on the catalyst used will contain a 1,4-cis fraction of more than 90%, a 1,2-vinyl fraction in isotactic or syndiotactic arrangement of more than 90%, or a 1,4-trans fraction of more than 90%. For example 1,4-trans-polybutadiene is obtained with catalysts of (a) titanium chlorides and vanadium halides and (b) trialkyl aluminum compounds, but 1,4-cis-polybutadiene with catalysts of (a) titanium tetraiodide and (b) trialkyl aluminum compounds, this product also being obtained with (a) cobalt compounds, such as cobalt chloride, cobalt acetylacetonate and cobalt compounds, and (b) alkyl aluminum dihalides, such as ethyl aluminum dichloride.

The various polybutadienes have some disadvantages as regards their further processing, their behavior in rolling and mixing and the quality of the shaped articles prepared therefrom by vulcanization. For example 1,4-cis-polybutadiene is obtained by polymerization in an amorphous form and has a melting point range of about −100° C.; by protracted crystallization a product is obtained which melts at about −20° C.

1,2-polybutadiene can only be prepared with a relatively low molecular weight and in the vulcanized final product does not reach the strength values of at least 160 kg./sq. cm. and elongation values of at least 300% which are usual for conventional rubber. Moreover its properties at low temperatures are inferior.

1,4-trans-polybutadiene can only be worked on rollers with great difficulty because it is very brittle and after having been vulcanized also does not reach the elongation and elasticity of conventional rubber vulcanizates. Its shore hardness on the other hand is too high.

Mixtures of 1,4-cis-polybutadiene and 1,4-trans-polybutadiene have worse properties in the vulcanized condition than vulcanized 1,4-cis-polybutadienes.

We have now found that butadiene polymers can be prepared particularly advantageously by polymerization of butadiene, using catalysts of compounds of transition metals of groups IV to VIII of the Periodic System of Elements and alkyl metal compounds, by reacting a solution of a practically unbranched and sterically unitary polybutadiene (A) having a K-value of from 20 to 80 with a solution of a practically unbranched and sterically unitary polybutadiene (B) having a K-value of from 20 to 80 which has the opposite configuration to polybutadiene (A), until the K-value of the polymer is 90 to 120, both solutions still containing active catalyst.

The solutions of the polybutadienes (A) and (B) are prepared by conventional methods and are used in the process while fresh (i.e. immediately after their production by polymerization of butadiene and without destruction of the polymerization catalysts). The solutions may contain unreacted butadiene, but the unreacted butadiene may also be removed from the solutions.

Reaction of the polybutadiene solutions is preferably carried out at temperatures of from −5° to +30° C. Reaction is continued until the K-value of the reaction product is 90 to 120.

Some embodiments of the process have proved to be particularly advantageous. For example it is of advantage to solution-polymerize butadiene by conventional methods into 1,4-cis-polybutadiene in one vessel and into 1,4-trans-polybutadiene in another vessel until the K-values of the polybutadienes are from 60 to 80 and then to mix the freshly obtained solutions with one another. The relative proportions of the two polybutadienes may be varied within a wide range. A ratio of 1,4-trans-polybutadiene to 1,4-cis-polybutadiene of from 0.01:1 to 1:1, particularly from 0.01:1 to 0.5:1, has proved to be particularly suitable.

It is also advantageous for the initial polymerization of butadiene in separate reaction vessels to be carried out so that in one vessel a 1,4-cis-polybutadiene or 1,4-trans-polybutadiene having a K-value of at least 60 is obtained, and in the other vessel a 1,4-trans-polybutadiene or 1,4-cis-polybutadiene of lower molecular weight is obtained having a K-value of from 20 to 50, the freshly obtained polybutadiene solutions being brought together continuously or batchwise and further polymerized in admixture until the K-value of the product obtained is at least 80. In this case relative proportions of 0.01 to 1 part, especially 0.1 to 0.5 part, of the component having the higher K-value to 1 part of the component having the lower K-value have proved to be particularly suitable.

The products obtained by the new process are clearly different from the prior art unitary, 1,4-cis-polybutadienes and 1,4-trans-polybutadienes and other conventional polybutadienes as well as from mixtures of 1,4-cis-polybutadienes and 1,4-trans-polybutadienes. They are probably stereo block polymers.

The new elastomeric polybutadienes are considerably superior to polybutadienes prepared by conventional methods in their strength in the unloaded condition after vulcanization. Moreover they have an excellent capacity for absorption of oil, good rolling behavior and good miscibility with other rubbers and/or fillers.

The catalyst systems may be those with which 1,4-cis-polybutadienes or 1,4-trans-polybutadienes may be prepared in solution with a steric configuration of at least 90% in each case.

Preferred suitable catalysts for the production of 1,4-cis-polybutadienes are mixtures of alkyl aluminum compounds, such as triethyl aluminum, and halotitanium compounds, such as titanium tetraiodide; triethyl aluminum with titanium tetraiodide and isopropyl ether; mixtures of diethyl aluminum monochloride with cobalt compounds, such as cobalt(II) acetylacetonate; and mixtures of alkyl lithium compounds, such as butyl lithium, and titanium tetraiodide.

Particularly suitable catalysts for the production of 1,4-trans-polybutadienes are triethyl aluminum with vanadium halides, such as vanadium trichloride, vanadium tetrachloride and vanadium oxychlorides. The molar ratio of the transition metal compounds to the organo-aluminum compounds is in general from 0.1:1 to 10:1, preferably 0.5:1. The amount of any activating additives used, such as ethers, amines, alcohols or water, is in the same order of magnitude as the amount of catalyst. The concentration of the catalyst is in general 0.01 to 0.1% by weight on the monomers.

The polymerization temperature is in general from $-65°$ to $+80°$ C., preferably below $0°$ C. and usually from $-45°$ to $-5°$ C.

Polymerization with these catalysts may be carried out in indifferent liquids as usual. Examples of liquids which are suitable for the purpose are saturated aliphatic, cycloaliphatic and/or aromatic hydrocarbons such as n-pentane, n-hexane, isohexane, n-heptane, n-octane, isooctane, cyclohexane, methylcyclohexane, benzene, tetrahydronaphthalene and decahydronaphthalene, and halogen derivatives of these hydrocarbons, such as chloroform, bromobenzene and methylene chloride, which are however preferably used in addition to the other liquids, the proportion thereof being not more than 10% by weight on the total amount of solvent.

The process according to this invention may be carried out continuously or batchwise. The products obtained according to the process are suitable for the production of molded articles, such as motor tires, with vulcanization, for diluting for example natural rubber or other conventional rubbers, such as copolymers of butadiene with styrene and/or acrylonitrile, and for the production of impact-resistant compositions. They are distinguished by high capacity for absorption of oils and fillers, such as carbon black and silicic acid, and the vulcanizates in the unloaded condition exhibit high tensile strength and elongation.

The following examples will illustrate the invention, the K-values in the examples having been determined in 0.5% solution in benzene by the method of H. Fikentscher, "Cellulosechemie" 13 (1932) 58.

Example 1

(a) Preparation of the solution of polybutadiene (A): 150 parts of butadiene dried over $Al_2O_3$ is added to 10,000 parts of dry n-hexane and at $-35°$ C. 0.025 ml. of diethyl aluminum chloride and 0.005 g. of cobalt(II) acetylacetonate is added per liter and polymerization is continued at this temperature until the K-value of the polymer is 61. The fraction having 1,4-cis structure is 92%.

(b) Preparation of the solution of polybutadiene (B): polymerization is continued until the polymer has a K-value of 68 with the same ratio of solvent to butadiene as under (a) and using 0.025 ml./liter of triethyl aluminum and 0.005 g./liter of vanadium oxychloride ($VOCl_3$) at $-30°$ C. The fraction of the polymer having 1,4-trans structure is 93%.

(c) Further polymerization of solutions (a) and (b) in admixture: Solutions (a) and (b) are combined and kept at $-5°$ C. for twelve hours. The catalyst is decomposed with methanol and the polymer is precipitated with more methanol. 270 parts of a soluble polymer is obtained which has a 1,4-cis traction of about 50% and a 1,4-trans fraction of about 47%. Its K-value is 87; its second order transition temperature is $-101°$ C. Its crystalline fraction (determined with a counting-tube goniometer) is 25%.

The capacity of the rubber obtained for absorption of oil is 40 parts of oil to 100 parts of rubber without the ultimate tensile strength being impaired. The ultimate tensile strength is 190 kg./sq. cm. in the loaded vulcanizate and 95 kg./sq. cm. in the unloaded vulcanizate. The ultimate tensile strength of 1,4-cis-polybutadiene on the other hand is only 150 kg./sq. cm. in the loaded vulcanizate and 5 kg./sq.cm. in the unloaded vulcanizate.

Example 2

The procedure of Example 1 is followed with the following alterations:

(a) Preparation of the solution of polybutadiene (A): butadiene, 100 parts; reaction temperature $-30°$ C.; catalyst per liter, 0.01 part of $\alpha TiCl_3$ and 0.03 part of tri-n-butyl aluminum; reaction time, ten hours. 80 parts of polymer is obtained; its K-value is 42 and it has a 1,4-cis fraction of 4%, a 1,4-trans fraction of 94% and a 1,2-vinyl fraction of 2%.

(b) Preparation of the solution of polybutadiene (B); butadiene, 50 parts; reaction temperature, $-30°$ C.; catalyst per liter, 0.005 part $\alpha TiCl_3$ and 0.5 part diethyl aluminum monoiodide; reaction time, five hours. 32 parts of polymer is obtained; it has a K-value of 63 and a 1,4-cis fraction of 92%, a 1,4-trans fraction of 5% and a 1,2-vinyl fraction of 3%.

(c) Further polymerization of solutions (a) and (b) in admixture: 136 parts of polymer is obtained. Its K-value is 102; it has a 1,4-cis fraction of 42%, a 1,4-trans fraction of 56.0% and a 1,2-vinyl fraction of 2%; its crystalline fraction is 21% by weight.

Example 3

The procedure of Example 1 is followed with the following variations:

(a) Preparation of the solution of polybutadiene (A): butadiene, 200 parts; reaction temperature, $-10°$ C.; catalyst per liter, 0.01 part of $\alpha TiCl_3$ and 0.03 part of diethyl aluminum chloride; reaction, twelve hours. 146 parts of polymer is obtained; its K-value is 96 and it has a 1,4-cis fraction of 1%, a 1,4-trans fraction of 97% and a 1,3-vinyl fraction of 2%.

(b) Preparation of the solution of polybutadiene (B): butadiene, 50 parts; reaction temperature, $-20°$ C., catalyst per liter, 0.5 part of $TiI_4$ and 0.05 part of tri-n-butyl aluminum; reaction time, five hours. 32 parts of polymer is obtained; its K-value is 49 and it has a 1,4-cis fraction of 72%, a 1,4-trans fraction of 20% and a 1,2-vinyl fraction of 8%.

(c) Further polymerization of solutions (a) and (b) in admixture: 219 parts of polymer is obtained. Its K-value is 99.5 and it has a 1,4-cis fraction of 32%, a 1,4-trans fraction of 65% and a 1,2-vinyl fraction of 3%; its crystalline fraction is 14% by weight.

Example 4

The procedure of Example 1 is followed with the following variations:

(a) Production of the solution of polybutadiene (A): butadiene, 200 parts; reaction temperature, −30° C.; catalyst per liter, 0.02 part of $TiCl_4$ and 0.5 part of tri-n-butyl aluminum; reaction time, eighteen hours. 149 parts of polymer is obtained; its K-value is 66 and it has a 1,4-cis fraction of 1% and a 1,4-trans fraction of 99%.

(b) Preparation of the solution of polybutadiene (B): butadiene, 10 parts; reaction temperature, −50° C.; catalyst per liter, 0.5 part of diethyl aluminum chloride and 0.5 part of $CoCl_2$ and 0.005 part of pyridine; reaction time, four hours. 6 parts of polymer is obtained; its K-value is 54.5 and it has a 1,4-cis fraction of 98%, a 1,4-trans fraction of 1% and a 1,2-vinyl fraction of 1%.

(c) Further polymerization of solutions (a) and (b) in admixture: 187 parts of polymer is obtained. Its K-value is 104; it has a 1,4-cis fraction of 27.5%, a 1,4-trans fraction of 72% and a 1,2-vinyl fraction of 0.5%; its crystalline fraction is 19% by weight.

Example 5

The procedure of Example 1 is followed with the following variations:

('a) Preparation of the solution of polybutadiene (A): butadiene, 200 parts; reaction temperature, −30° C.; catalyst per liter, 0.05 part of tri-n-butyl aluminum and 0.6 part of cobalt(II) acetylacetonate; reaction time: eleven hours. 132 parts of polymer is obtained; its K-value is 87 and it has a 1,4-cis fraction of 9%, a 1,4-trans fraction of 7% and a 1,2-vinyl fraction of 84%.

(b) Preparation of the solution of polybutadiene (B): butadiene, 100 parts; reaction temperature, 25° C.; catalyst per liter, 0.05 part of tri-n-butyl aluminum and 0.9 part of $VOCl_3$; reaction time, three hours. 87 parts of polymer is obtained; its K-value is 35 and it has a 1,4-cis fraction of 1%, a 1,4-trans fraction of 98% and a 1,2-vinyl fraction of 1%.

(c) Further polymerization of solutions (a) and (b) in admixture: 164 parts of polymer is obtained. Its K-value is 112.5; it has a 1,4-cis fraction of 3%, a 1,4-trans fraction of 59% and a 1,2-vinyl fraction of 38%; its crystalline fraction is 22% by weight.

Example 6

The procedure of Example 1 is followed but with the following changes:

(a) Preparation of the solution of polybutadiene (A): butadiene, 100 parts; reaction temperature, −10° C.; catalyst per liter, 0.5 part of triethyl aluminum and 1.0 part of vanadium(III) acetylacetonate; reaction time, four hours. 63.5 parts of polymer is obtained; its K-value is 71 and it has a 1,4-cis fraction of 3%, a 1,4-trans fraction of 3% and a 1,2-vinyl fraction of 94%.

(b) Preparation of the solution of polybutadiene (B): butadiene, 200 parts; reaction temperature, −30° C.; catalyst per liter, 0.5 part of triethyl aluminum and 1.1 parts of tungsten(IV) chloride; reaction time, nine hours. 154 parts of polymer is obtained; its K-value is 31.5 and it has a 1,4-cis fraction of 8%, a 1,4-trans fraction of 83% and a 1,2-vinyl fraction of 9%.

(c) Further polymerization of solutions (a) and (b) in admixture: 231.5 parts of polymer is obtained. Its K-value is 108.5; it has a 1,4-cis fraction of 2%, a 1,4-trans fraction of 70% and a 1,2-vinyl fraction of 28%; its crystalline fraction is 16% by weight.

Example 7

The procedure of Example 1 is followed but with the following alterations:

(a) Preparation of the solution of polybutadiene (A): butadiene, 50 parts; reaction temperature, +10° C.; catalyst per liter, 0.5 part of tripropyl aluminum and 1.8 parts of chromium(III) chloride; reaction time: two and a half hours. 36.5 parts of polymer is obtained; its K-value is 24 and it has a 1,4-cis fraction of 2%, a 1,4-trans fraction of 8% and a 1,2-vinyl fraction of 90%.

(b) Preparation of the solution of polybutadiene (B): butadiene, 150 parts; reaction temperature, −15° C.; catalyst per liter, 1.5 parts of tri-n-butyl aluminum and 4.3 parts of iron(III) chloride; reaction time, seven hours. 117 parts of polymer is obtained; its K-value is 91 and it has a 1,4-cis fraction of 9%, a 1,4-trans fraction of 79% and a 1,2-vinyl fraction of 12%.

(c) Further polymerization of solutions (a) and (b) in admixture: 189 parts of polymer is obtained. Its K-value is 93; it has a 1,4-cis fraction of 2%, a 1,4-trans fraction of 66% and a 1,2-vinyl fraction of 32%; its crystalline fraction is 25% by weight.

Example 8

The procedure of Example 1 is followed but with the following variations:

(a) Preparation of the solution of polybutadiene (A): butadiene, 10 parts; reaction temperature, +5° C.; catalyst per liter, 0.5 part of triphenyl aluminum and 1.2 parts of molybdenum(V) chloride; reaction time, four hours. 4 parts of polymer is obtained; its K-value is 73 and it has a 1,4-cis fraction of 9%, a 1,4-trans fraction of 87% and a 1,2-vinyl fraction of 4%.

(b) Preparation of the solution of polybutadiene (B): butadiene, 90 parts; reaction temperature, −30° C.; catalyst per liter, 0.5 part of triethyl aluminum and 4.9 parts of molybdenum(VI) acetylacetonate; reaction time, fourteen hours. 72 parts of polymer is obtained; its K-value is 87.5 and it has a 1,4-cis fraction of 32%, a 1,4-trans fraction of 48% and a 1,2-vinyl fraction of 20%.

(c) Further polymerization of solutions (a) and (b) in admixture: 89.5 parts of polymer is obtained. It has a K-value of 98.5; it has a 1,4-cis fraction of 33%, a 1,4-trans fraction of 50% and a 1,2-vinyl fraction of 17%; its crystalline fraction is 21.5% by weight.

Example 9

The procedure as described in Example 1 is followed, but step (b) is carried on only until the K-value of the trans-polymer is 45 and process step (c) is carried on for eight hours at 10° C. With otherwise the same conditions, 255 parts of a polymer is obtained which is soluble in the usual solvents, has a K-value of 89.5 and has a 1,4-cis fraction of 52% and a 1,4-trans fraction of 43%. Its second order transition temperature is −102° C. Its crystalline fraction is 19% by weight.

The ultimate tensile strength of the product is 183 kg./sq. cm. in the loaded vulcanizate and 81 kg./sq. cm. in the unloaded vulcanizate.

Example 10

The procedure of Example 9 is followed but in step (c) the reaction solution obtained in step (b) is continuously added to the reaction solution from step (a); the other conditions are the same 238 parts of a soluble polymer having a K-value of 93 is obtained which has a 1,4-cis fraction of 46% and a 1,4-trans fraction of 51%. Its crystalline fraction is 18% by weight.

Example 11

The procedure of Example 4 is not followed but prior to stopping the polymerization by methanol, 1.0 part of cobalt(II) acetylacetonate is added and the whole left at 50° C. for two hours. The reaction is then stopped with methanol and worked up. 198 parts of a polymer is obtained which has a K-value of 114, contains a crystalline fraction of 15% and has 28% of 1,4-cis configuration, 69% of 1,4-trans configuration and 3% of 1,2-vinyl configuration.

We claim:

1. A process for the production of stereo block polymers of butadiene which comprises: forming a solution of unbranched and sterically unitary 1,4-trans-polybutadiene having a K-value of 20 to 80, said solution containing actice catalyst; forming a solution of 1,4-cis-polybutadiene having a K-value of 20 to 80, said solution containing active catalyst; combining said solutions to form a reaction mixture having a ratio of 1,4-trans-polybutadiene to 1,4-cis-polybutadiene of from 0.01:1 to 1:1 and carrying out said reaction until the K-value of the formved stereo block polymer is from 90 to 120, said catalysts being halides or acetylacetonates of transition metals of Groups IV to VIII of the Periodic System and alkyl compounds of aluminum or lithium.

2. A process as claimed in claim 1 wherein one of said solutions contains a polymer having a K-value of at least 60 and the other solution contains a polymer having a K-value of from 20 to 50.

3. A process as claimed in claim 1 wherein the reaction is carried out at temperatures of from −5° to +30° C.

4. A process as claimed in claim 1 wherein a solution of 1,4-cis-polybutadiene is prepared in one vessel and a solution of 1,4-trans-polybutadiene in another vessel until the K-values of the polybutadienes are of from 60 to 80 and the freshly obtained solutions are mixed with one another.

References Cited

UNITED STATES PATENTS

| 3,140,278 | 7/1964 | Kuntz | 260—879 XR |
| 3,244,773 | 4/1966 | Crouch | 260—894 |
| 3,402,163 | 9/1968 | Schleimer et al. | 260—94.3 |

MURRAY TILLMAN, Primary Examiner

K. E. KUFFNER, Assistant Examiner

U.S. Cl. X.R.

260—94.3, 894

PO-1050
(5/69)

UNITED STATES PATENT OFFICE
CERTIFICATE OF CORRECTION

Patent No. 3,476,830      Dated November 4, 1969

Inventor(s)    Herbert Naarmann et al

It is certified that error appears in the above-identified patent and that said Letters Patent are hereby corrected as shown below:

Column 2, line 67, "unitary," should read --unitary--.

Column 4, line 60, "reaction" should read --reaction time--.

Column 5, line 34, "25°" should read "-25°".

Column 6, line 60, "same" should read --same.--.

Column 7, line 10, "formved" should read --formed--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents